US006909751B2

United States Patent
Miro Sorolla et al.

(10) Patent No.: US 6,909,751 B2
(45) Date of Patent: Jun. 21, 2005

(54) DEVICE JOINTLY IMPLEMENTING A POST-PROCESSING AND A DECODING OF DATA

(75) Inventors: Carolina Miro Sorolla, Villecresnes (FR); Arnaud Gesnot, Montigny le Bretonneux (FR); Jorge E. Caviedes, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 614 days.

(21) Appl. No.: 10/104,953

(22) Filed: Mar. 22, 2002

(65) Prior Publication Data

US 2002/0196856 A1 Dec. 26, 2002

(30) Foreign Application Priority Data

Mar. 27, 2001 (FR) .............................. 01 04109

(51) Int. Cl.[7] ................................................ H04N 7/12
(52) U.S. Cl. .................. 375/240.2; 382/233; 348/419.1
(58) Field of Search ....................... 375/240.24, 240.28, 375/240.14, 240.26, 240.18; 382/233; 714/755, 795; 386/37; 348/419.1

(56) References Cited

U.S. PATENT DOCUMENTS

| 5,991,494 A | * | 11/1999 | Otsuka ........................ 386/37 |
| 6,259,741 B1 | * | 7/2001 | Chen et al. ............. 375/240.26 |
| 6,477,679 B1 | * | 11/2002 | Such et al. .................. 714/755 |
| 6,732,328 B1 | * | 5/2004 | McEwen et al. ............. 714/795 |

OTHER PUBLICATIONS

"A Projection–Based Post–Processing Technique to Reduce Blocking Artifacts Using a Priori Information on DCT Coeffeicients of Adjacent Blocks" published by Hoon Paek and Sang–Uk Lee in Proceedings of 3rd IEEE International Conference on Image Processing, vol. 32, Lausanne, Switzerland, Sept. 16–19, 1996, pp 53–56.

* cited by examiner

*Primary Examiner*—Gims Philippe

(57) ABSTRACT

The present invention relates to a device for processing blocks of coded data included in a sequence of coded digital images (ES) according to a block-based coding technique, said device comprising a post-processing circuit DFD (33). Such a device effectively corrects the blocking artifacts while minimizing the bandwidth used, the decoder directly transmitting decoded data blocks (B) to the post-processing circuit. In addition, such a device introduces no or little drift during the decoding since the decoder continues to use reference images (RB) during a motion compensation step. This is because the reference images are no longer the decoded images but the completely processed images as the post-processing circuit is situated in the decoding loop.

6 Claims, 3 Drawing Sheets

DEVICE JOINTLY IMPLEMENTING A POST-PROCESSING AND A DECODING OF DATA

FIELD OF THE INVENTION

The present invention relates to a method of and device for processing coded datablocks included in a sequence of digital images coded according to a block-based coding technique.

It finds it application in the correction of blocking which appear in a sequence of digital images previously coded and then decoded according to a block-based coding technique, the MPEG (Moving Pictures Expert Group) standard for example, this correction attenuating the visibility of such artifacts caused by the block-based coding technique.

PRIOR ART

The article entitled "A projection-based post-processing technique to reduce blocking artifacts using a priori information on DCT coefficients of adjacent blocks", published by Hoon Paek and Sang-Uk Lee in "Proceedings of $3^{rd}$ IEEE International Conference on Image Processing, Vol 2, Lausanne, Switzerland, 16–19 Sept. 1996, p. 53–56" describes a method of processing data included in a digital image.

Such a data processing method comprises the following steps, depicted in FIG. 1, namely:

a step of calculating a first discrete cosine transformation DCT1 (11) of a first segment (u) of N pixels with N=8 in the example used, resulting in a first transformed segment U, a step of calculating a first discrete cosine transformation DCT1 (12) of a second segment (v) of N pixels, the second segment being adjacent to the first one, resulting in a second transformed segment V, a step (13) of determining a predicted maximum frequency (kpred) as a function of maximum frequencies ku and kv of U and V, as follows:

kpred=2.max(ku,kv)+2 with ku=max(k∈{0, . . . , N−1}/U(k)≠0), kv=max(k∈{0, . . . , N−1}/V(k)≠0), and max is the function which gives the maximum of k among a set of given values, a step (15) of processing a concatenated segment (w) comprising 2N pixels, that is to say 16 pixels in our case, and corresponding to the concatenation (14) of the first (u) and second (v) segments, said processing step comprising the following substeps of:

calculating a second discrete cosine transformation DCT2 (16) of the concatenated segment (w), resulting in a transformed concatenated segment W, correcting (17), by setting to zero, the transformed data W(k) whose frequency k is odd and greater than the predicted maximum frequency (kpred), supplying a corrected transformed concatenated segment Wc, calculating an inverse discrete transformation IDCT2 (18) of the corrected transformed segment Wc, supplying a corrected concatenated segment (cw).

SUMMARY OF THE INVENTION

It is an object of the present invention to propose an architecture allowing a processing of coded data blocks included in a sequence of digital images coded according to a block-based coding technique, which uses a lower capacity of transmission of the data during processing.

In fact the processing method described in the prior art is intended to be implemented at the output of a decoder. The functioning of an architecture using such a method as the one described with reference to FIG. 2 requires, in the most unfavorable case corresponding to the decoding of an image with bidirectionally predictive coding called B-image, two reference images (RP) which, via a data bus, pass from an interface memory (22) to a decoder (21). The decoder, from a coded image (ES), supplies a decoded image ($DP_{k+1}$) to the interface memory. In parallel to the decoding, an already decoded image ($DP_k$) is processed by a post-processing circuit (22) implementing the method of the prior art, said circuit supplying a processed image ($CP_k$) to the interface memory. In parallel to the processing, an image already stored in the interface memory ($CP_{k-1}$) is displayed on a screen by a display device (DIS). Such an architecture is costly in terms of transmission capacity since the bandwidth of the data bus is at most 6 images (an image corresponding to a bandwidth of 216 Mbit/s in a 4:2:2 coding format), namely two reference images read by the decoder, one image decoded by the decoder, one decoded image read by the post-processing circuit, one processed image and one image read by the display device.

In order to mitigate these drawbacks, the coded data block processing device as described in the opening paragraph is characterized in that it comprises:

a post-processing circuit able to effect a horizontal processing of data blocks of an image, associated with a vertical processing of said blocks, the horizontal or vertical processing comprising a unitary processing of a first block, the unitary processing of a second block adjacent to said first block and a double processing of the concatenation of the first and second blocks, the post-processing circuit being able to supply concatenated blocks of processed data comprising blocks of completely processed, partially processed and preprocessed data, the pre-processed data being intended to be reused by the post-processing circuit, a decoding unit able to receive the coded data blocks and to supply decoded datablocks to the post-processing circuit, a memory interface able to supply data blocks already partially processed to the post-processing circuit, and to store the partially processed data blocks for subsequent processing by the post-processing circuit as well as the completely processed data blocks for display on a screen.

Such a device makes it possible to effectively correct the blocking artifacts while minimizing the bandwidth used, since the decoder directly transmits the decoded data blocks to the post-processing circuit. In addition, such a device does not introduce any drift, or only slightly so, during decoding since the decoder continues to use reference images during motion compensation. This is because, the post-processing circuit being situated in the decoding loop, the reference images are no longer the decoded images but the completely processed images.

In a particularly advantageous embodiment of the invention, the data processing device also comprises:

an internal input memory able to load future blocks of decoded and already partially processed data for future processing by the post-processing circuit, and an internal output memory able to store past blocks of data processed and partially processed by the post-processing circuit, the post-processing circuit being able to effect a current processing of the current blocks of decoded, partially processed and pre-processed data contained in the internal input memory.

Thus the data processing device functions according to a pipeline principle and uses, in a better way, very slender resources in terms of internal memory, said memories being fairly expensive. Such a solution is therefore particularly economical.

BRIEF DESCRIPTION OF THE DRAWINGS

The invention will be further described with reference to examples of embodiments shown in the drawings to which, however, the invention is not restricted.

DETAILED DISCLOSURE OF AT LEAST ONE EMBODIMENT OF THE INVENTION

Figure 1:
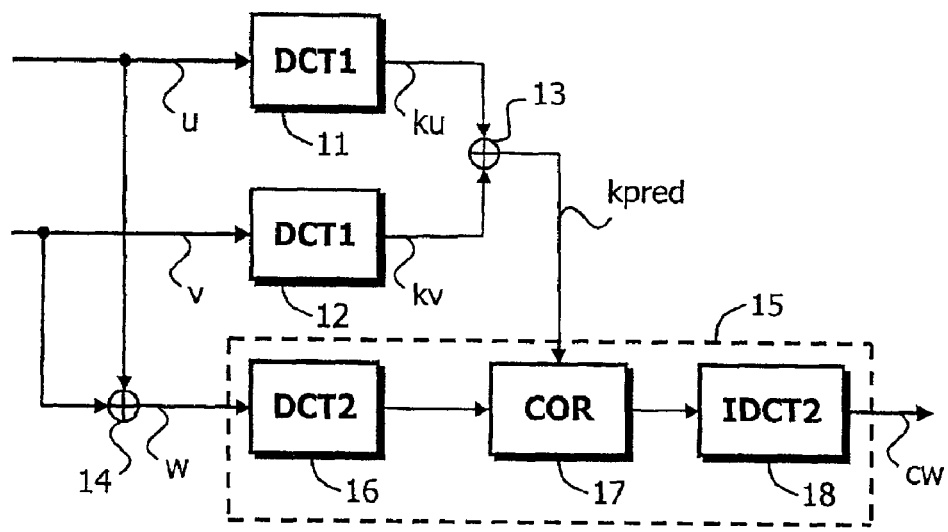
FIG. 1 illustrates a blocking artifact correction method corresponding to the prior art.
Figure 2:
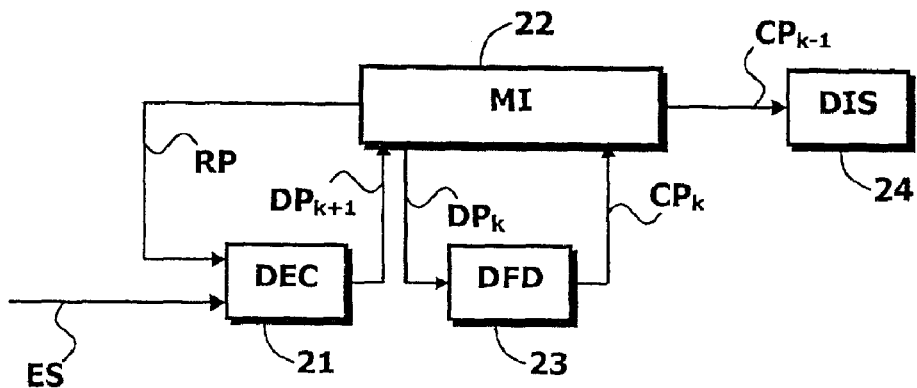
FIG. 2 depicts an example of architecture directly implementing the blocking artifact correction method defined in the prior art.

The present invention relates to the implementation of a data block post-processing method, known as the DFD ("DCT Frequency Deblocking") method. As seen previously, this method effects a complete processing of a sequence of images coded according to a block-based coding technique in order to correct the visual artifacts due to the coding technique. The post-processing method can be implemented according to the principle described in the prior art.

In a preferred embodiment of the invention, it is implemented by introducing filtering thresholds according to the following principle:

$$kumax = max(k(\{0, \ldots, N-1\}/abs(U(k))>T)$$

$$kumax = max(k(\{0, \ldots, N-1\}/abs(V(k))>T)$$

where T is a threshold different from zero.

The determination step (13) thus effects a more precise calculation of the predicted maximum frequency (kpred) from the introduction of the threshold T, which allows a more effective correction of the blocking artifacts. The value of the threshold T is a function of the size of the segments u and v. This is because it is possible to process only some of the pixels of the segments u and v, for example the pixels of even rank or odd rank.

The correction step COR (17) preferably comprises a substep of detecting natural contours from the values of the pixels of the initial segments u and v and transformed segments U and V. This substep makes it possible to distinguish the natural contours of the blocking artifacts. For this purpose, a natural contour is detected if two conditions are fulfilled:

the mean values of the pixels of the segments u and v on each side of a block boundary are different by a high value, greater than M, the segments u and v are of low activity, which results in the fact that the values ku and kv are low and less than a value k0.

The data block post-processing method also comprises at least one horizontal processing H of an image, associated with at least one vertical processing V of said image. This is because the blocking artifacts can be present at the boundaries of the block, that is to say on the four segments delimiting the block vertically or horizontally, a data block coded according to the MPEG standard generally comprising 8 rows of 8 pixels. If the image is processed in a horizontal direction, vertical blocking artifacts will be detected; conversely, if the image is processed in a vertical direction, horizontal blocking artifacts will be detected.

The data block post-processing method is applied successively to each of the two frames constituting an image if the image is composed of two frames. It is applied preferably to the luminance data contained in the digital image. In all cases, the data block post-processing method is applied to a first data block and to a second data block adjacent to it, row by row or column by column according to the processing direction.

The architecture implementing the post-processing method comprises four main steps:

a first discrete cosine transformation DCT1 of a segment of N pixels corresponding to $N^2$ multiplications and $N^2$ additions, a second discrete cosine transformation DCT2 of a segment of 2N pixels corresponding to $4N^2$ multiplications and $4N^2$ additions, a correction COR of the transformed segment of length 2N corresponding to 4 additions, and an inverse discrete cosine transformation IDCT2 of a segment of 2N pixels corresponding to $4N^2$ multiplications and $4N^2$ additions.

In order to obtain a complete processing of the image making it possible to correct both the horizontal blocking artifacts and the vertical blocking artifacts, there are for each block:

four first discrete cosine transformations DCT1, two in the horizontal direction and two in the vertical direction, that is to say 203,328 transformations for a complete image corresponding to 5.09 million elementary operations per second, two second discrete cosine transformations DCT2, one in the horizontal direction and one in the vertical direction, that is to say 101,664 transformations for a complete image corresponding to 2.55 million elementary operations per second, two corrections COR of the transformed segment, one in each direction, that is to say 101,664 corrections for a complete image corresponding to 2.55 million elementary operations per second, two inverse discrete cosine transformations IDCT2, also one in each direction, that is to say 101,664 transformations for a complete image corresponding to 2.55 million elementary operations per second.

Figure 3:
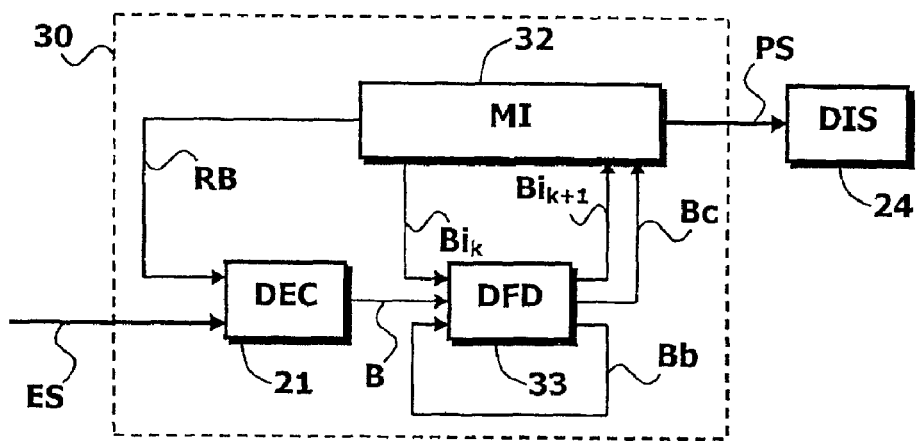
FIG. 3 depicts an architecture effecting a data processing according to the invention, where a post-processing circuit effecting the blocking artifact correction is able to directly process the data issuing from the decoder.

FIG. 3 depicts an architecture (30) effecting a data processing according to the invention. Such an architecture comprises:

a post-processing circuit DFD (33) effecting the connection of blocking artifacts and able to effect a horizontal processing of data blocks of an image, associated with a vertical processing of said blocks, the horizontal or vertical processing comprising a unitary processing of a first block, the unitary processing of a second block adjacent to said first block and a double processing of the concatenation of the first and second blocks, the post-processing circuit being able to supply concatenated blocks of processed data comprising blocks of completely processed (Bc), partially processed ($Bi_{k+1}$) and preprocessed (Bb) data, the preprocessed data being intended to be reused by the post-processing circuit, a decoding unit DEC (21) able to receive the coded data blocks and to supply directly macroblocks containing decoded data blocks (B) to the post-processing circuit, a memory interface MI (32) able to supply to the decoding unit reference data blocks (RB) corresponding to blocks completely processed by the post-processing circuit, for decoding a current macroblock, to supply blocks of already partially processed data ($Bi_k$) to the post-processing circuit, and to store the partially processed data blocks ($Bi_{k+1}$) for subsequent processing by the post-processing circuit as well as the completely processed data blocks (Bc) for display on a screen DIS (24).

Figure 4:
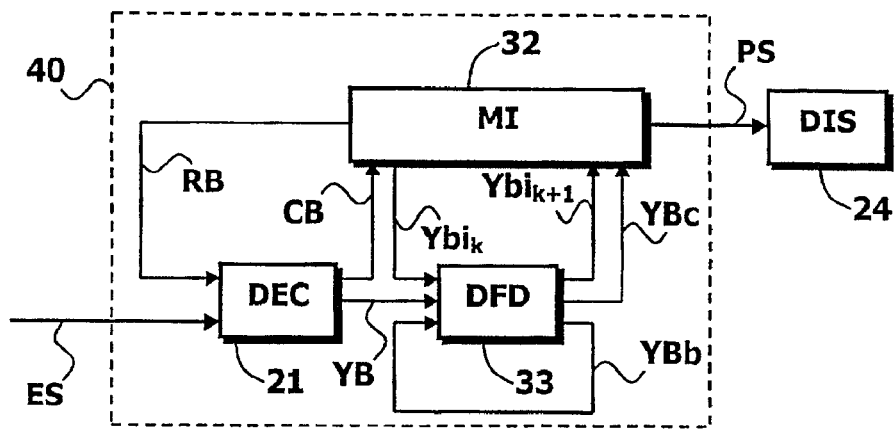
FIG. 4 depicts an architecture effecting a data processing according to the invention, where the post-processing circuit is able to directly process the luminance data issuing from the decoder.

In a preferred embodiment of the invention, depicted in FIG. 4, the decoding unit DEC (21), effecting a decoding macroblock by macroblock, is able to transmit 4 blocks of luminance data (YB) to the post-processing circuit and chrominance blocks, 4 in the case of a 4:2:2 image format, to the memory interface MI (32).

The post-processing circuit DFD (33) is able to supply concatenated blocks of processed luminance data comprising 4 blocks of completely processed data (YBc), 2 blocks of partially processed data ($YBi_{k+1}$), and 2 blocks of preprocessed data (YBb) reused by the post-processing circuit.

The memory interface is able to supply reference data blocks (RB) to the decoding unit and two already partially processed luminance data blocks ($YBi_k$) to the post-processing circuit, and to store the 2 blocks of partially processed data ($YBi_{k+1}$) for subsequent processing by the post-processing unit as well as the 4 completely processed data blocks (YBc) for display on a screen DIS (24).

Thus the bandwidth used is a maximum of 4.5 images, in the case where only the luminance data are processed, and 5 images in the case where the luminance and chrominance data are processed, that is to say a bandwidth appreciably less than that which a direct processing, as described in the disclosure of the invention, would have given.

In addition, such a data processing architecture supplies to the decoding unit reference data blocks, corresponding to blocks completely processed by the post-processing circuit, to enable it to effect a motion compensation. Using completely processed data blocks may sometimes give rise to a slight drift during decoding. A control device, not shown here, can then inhibit the post-processing circuit using an indication of the image type supplied by the decoding unit. The control device can for example inhibit the post-processing circuit for a sequence of images comprising a certain number of successive predictive-coding images P, such a configuration being able to be a source of drift during decoding.

Figure 5:
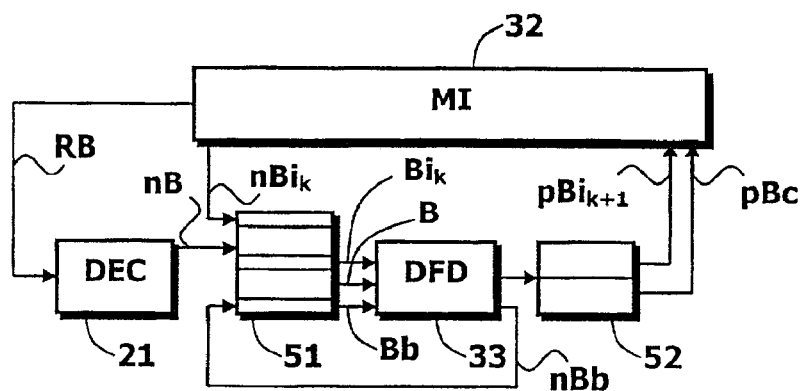
FIG. 5 depicts an advantageous embodiment of the data processing architecture functioning according to a pipeline principle.

FIG. 5 depicts an advantageous embodiment of the data processing architecture according to the invention. This architecture functions according to a pipeline principle.

Whilst the post-processing circuit DFD (33) processes the current data blocks ($Bi_k$, B, Bb) stored in an internal input memory (51), the future data blocks (nB, $nBi_k$) issuing from the decoding unit (21) and from the memory interface (32) are stored in the internal input memory.

At the output of the post-processing circuit, an internal output memory (52) contains the past blocks of data processed (pBc) and partially processed ($pBi_{k+1}$) by the post-processing circuit, with a view to their transmission to the memory interface.

Figure 6:
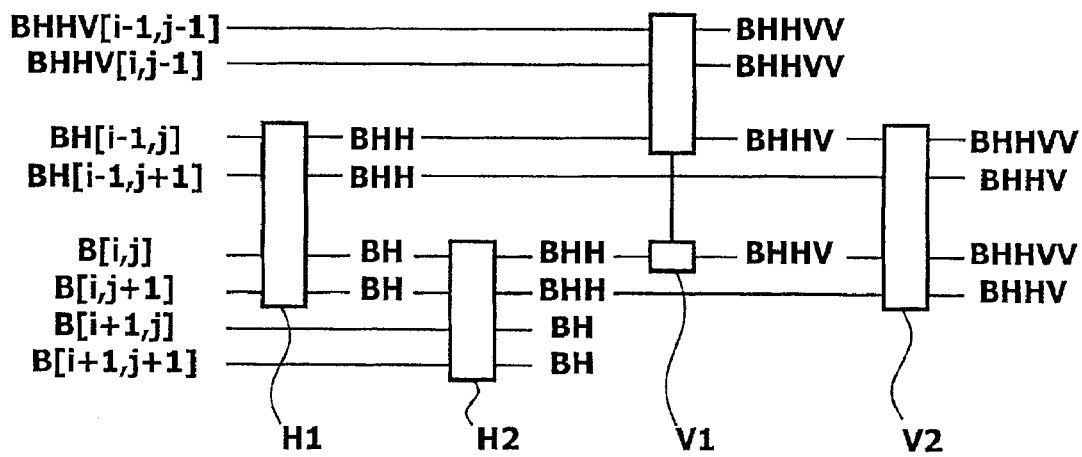
FIG. 6 illustrates the functioning of the post-processing circuit according to the invention.

FIG. 6 illustrates the functioning of the post-processing circuit according to the invention during a processing cycle.

From a time t to a time (t+1) the post-processing circuit DFD will effect the following processings in the order indicated:

a first horizontal processing H1 of the 4 blocks BH[i−1,j], BH[i−1,j+1], B[i,j] and B[i,j+1], supplying blocks BHH[i−1,j], BHH[i−1,j+1], BH[i,j] and BH[i,j+1], a second horizontal processing H2 of the 4 blocks BH[i,j], BH[i,j+1], B[i+1,j] and B[i+1,j+1], supplying blocks BHH[i,j], BHH[i,j+1], BH[i+1,j] and BH[i+1, j+1], a first vertical processing V1 of the 4 blocks BHHV[i−1,j−1], BHHV[i,j−1], BHH[i−1,j] and BHH[i,j], supplying blocks BHHVV[i−1,j−1], BHHVV[i,j−1], BHHV[i−1, j] and BHHV[i,j], and a second vertical processing V2 of the 4 blocks BHHV[i−1,j], BHHV[i,j], BHH[i−1,j+1] and BHH[i,j+1], supplying blocks BHHVV[i−1,j], BHHVV[i,j], BHHV[i−1,j+1] and BHHV[i,j+1].

Figure 7:
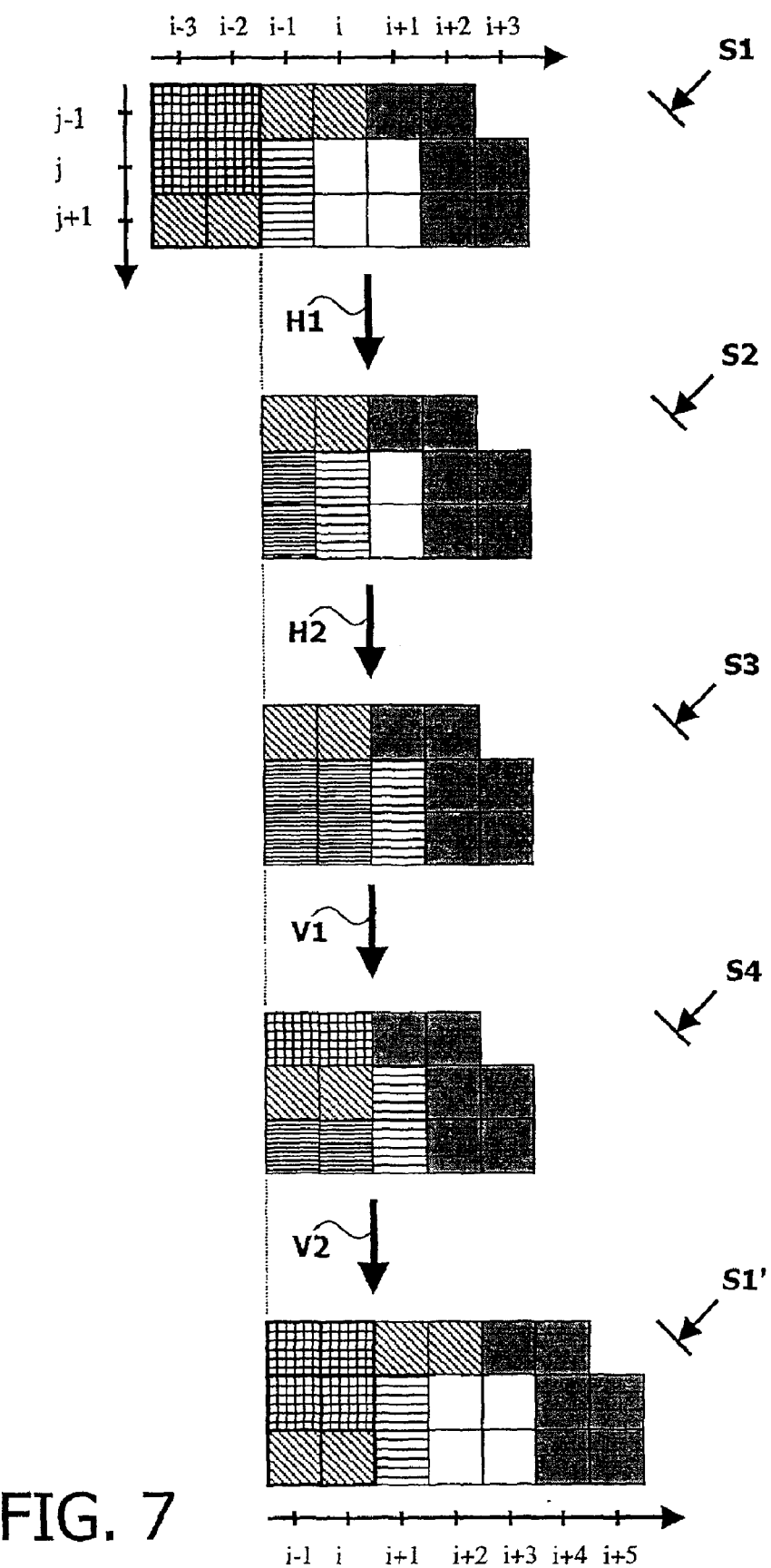
FIG. 7 illustrates the successive states of data blocks belonging to an image, during a cycle of data processing by the post-processing circuit according to the invention.

FIG. 7 illustrates the successive states of the data blocks belonging to an image, during the cycle of data processing by the post-processing circuit according to the invention.

The internal input memory contains, at a time t corresponding to a first state (S1), the following 14 blocks:

4 blocks for loading the data coming from the decoder: B[i+2,j], B[i+3,j], B[i+2,j+1] and B[i+3,j+1], 2 blocks for loading the data coming from the interface memory: BHHV[i+1,j−1] and BHHV[i+2,j−1], 4 blocks for processing by the DFD: B[i,j], B[i+1,j], B[i,j+1] and B[i+1,j+1], 2 preprocessed blocks, that is to say processed horizontally at a previous time (t−1), for a new processing by the DFD: BH[i−1,j] and BH[i−1,j+1], and 2 blocks already processed one line earlier for processing by the DFD: BHHV[i−1,j−1] and BHHV[i,j−1].

The internal output memory contains, at the same time, the following 6 blocks:

2 blocks after a vertical processing V1 by the DFD: BHHVV[i−3,j−1] and BHHVV[i−2,j−1], intended to be sent to the display unit, 1 block after horizontal H1 and vertical V1 and V2 processings by the DFD BHHVV[i−3,j], intended to be sent to the display unit, 1 block after horizontal H1 and vertical V2 processings by the DFD BHHV[i−3,j+1], intended to be sent to the interface memory, 1 block after horizontal H1 and H2 and vertical V1 and V2 processings by the DFD BHHVV[i−2,j], intended to be sent to the display unit, and 1 block after horizontal H1 and H2 and vertical V2 processings by the DFD BHHV[i−2,j+1], intended to be sent to the interface memory.

The data processing device according to the invention uses, in this configuration, optimized memory resources, the internal input memory being of 7 kilobytes and the internal output memory being of 3 kilobytes in the preferred embodiment.

After the first horizontal processing H1, corresponding to a second state (S2), the blocks BHH[i−1,j], BHH[i−1,j+1], BH[i,j] and BH[i,j+1] are obtained.

After the second horizontal processing H2, corresponding to a third state (S3), the blocks BHH[i,j], BHH[i,j+1], BH[i+1,j] and BH[i+1,j+1] are obtained.

After the first vertical processing V1, corresponding to a fourth state (S4), the blocks BHHVV[i−1,j−1], BHHVV[i,j−1], BHHV[i−1,j] and BHHV[i,j] are obtained.

Finally, after the second vertical processing V2, corresponding to a fifth state (S1'), the blocks BHHVV[i−1,j], BHHVV[i,j], BHHV[i−1,j+1] and BHHV[i,j+1] are obtained.

The data processing architecture (30, 40) according to the present invention can be produced in the form of integrated circuits, as described previously, or in the form of software loaded on one or more circuits. The software uses a coded data block processing method which repeats here the functional blocks of FIG. 3. Said method thus comprises the following steps of:

post-processing (33) to effect a horizontal processing of data blocks of an image associated with a vertical processing of said blocks, the horizontal or vertical processing comprising a unitary processing of a first block, the unitary processing of a second block adjacent to said first block and a double processing of the concatenation of the first and second blocks, the post-processing step being able to supply concatenated blocks of processed data comprising completely processed (Bc), partially processed $Bi_{k+1}$), and preprocessed (Bb) data blocks, the preprocessed blocks being intended to be reused by the post-processing step, decoding (21) for receiving the coded data blocks and for supplying decoded data blocks (B) at the post-processing step, storage (32) for supplying blocks of data ($Bi_k$) already partially processed at the post-processing step and for storing the partially processed data blocks ($Bi_{k+1}$), for subsequent processing by the post-processing step as well as the completely processed data blocks (Bc) for display on a screen (24).

Such a data processing method thus minimizes the time required for access to a memory and therefore optimizes the method execution time.

There exist many ways for implementing the functions described by means of software. In this regard, FIGS. 3 and 4 are highly schematic, each figure depicting only one embodiment. Therefore, although a figure shows different functions in the form of separate blocks, this does not exclude a single item of software performing several functions. Neither does this exclude a function being able to be performed by a set of items of software.

It is possible to implement these functions by means of a video decoder circuit or a set top box circuit, said circuit being suitably programmed. A set of instructions contained in a programming memory can cause the circuit to perform the different operations described above with reference to FIGS. 3 and 4. A set of instructions can also be loaded into the programming memory by reading a data carrier such as for example a disk which contains the set of instructions. The reading can also be effected by means of a communication network such as, for example, the Internet. In this case, a service provider will make the set of instructions available to interested parties.

No reference sign between brackets in the present text should be interpreted limitatively. The verb "to comprise" and its conjugations do not exclude the presence of elements or steps other than those listed in a sentence. The word "one" preceding an element or a step does not exclude the presence of a plurality of such elements or steps.

What is claimed is:

1. A device for processing coded data blocks included in a sequence of coded digital images (ES) according to a block-based coding technique, said device comprising:

a post-processing circuit (33) able to effect a horizontal processing of data blocks of an image, associated with a vertical processing of said blocks, the horizontal or vertical processing comprising a unitary processing of a first block, the unitary processing of a second block adjacent to said first block and a double processing of the concatenation of the first and second blocks, the post-processing circuit being able to supply concatenated blocks of processed data comprising blocks of completely processed (Bc), partially processed ($Bi_{k+1}$) and pre-processed data (Bb), the pre-processed data being intended to be reused by the post-processing circuit, a decoding unit (21) able to receive the coded data blocks and to supply decoded datablocks (B) to the post-processing circuit, a memory interface (32) able to supply data blocks already partially processed ($Bi_k$) to the post-processing circuit, and to store the partially processed data blocks ($Bi_{k+1}$) for subsequent processing by the post-processing circuit as well as the completely processed data blocks (Bc) for display on a screen (24).

2. A data processing device as claimed in claim 1, also comprising:

an internal input memory (51) able to load future blocks of decoded (nB) and already partially processed ($nBi_k$) data for future processing by the post-processing circuit (33), and an internal output memory (52) able to store past blocks of data processed (pBc) and partially processed ($pBi_{k+1}$) by the post-processing circuit, the post-processing circuit being able to effect a current processing of the current blocks of decoded (B), partially processed ($Bi_k$) and pre-processed (Bb) data contained in the internal input memory.

3. A circuit (33) for processing data blocks issuing from a decoding unit (21) able to effect a horizontal processing of the data blocks, combined with a vertical processing of said blocks, the horizontal or vertical processing comprising a unitary processing of a first block, the unitary processing of a second block adjacent to said first block and a double processing of the concatenation of the first and second blocks, the post-processing circuit being able to supply concatenated blocks of processed data comprising completely processed (Bc), partially processed ($Bi_{k+1}$), and preprocessed (Bb) data blocks, the preprocessed data being intended to be reused by the post-processing circuit and the processed data blocks (Bc, $Bi_{k+1}$) being intended to be transmitted to an interface memory (32).

4. A method of processing coded data blocks included in a sequence of coded digital images (ES) according to a block-based coding technique, said method comprising the following steps of:

post-processing (33) for effecting a horizontal processing of data blocks of an image associated with a vertical processing of said blocks, the horizontal or vertical processing comprising a unitary processing of a first block, the unitary processing of a second block adjacent to said first block and a double processing of the concatenation of the first and second blocks, the post-processing step being able to supply concatenated blocks of processed data comprising completely processed (Bc), partially processed $Bi_{k+1}$, and preprocessed (Bb) data blocks, the preprocessed blocks being intended to be reused by the post-processing step, decoding (21) for receiving the coded data blocks and for supplying decoded data blocks (B) at the post-processing step, storage (32) for supplying blocks of data ($Bi_k$) already partially processed at the post-processing step and for storing the partially processed data blocks ($Bi_{k+1}$), for subsequent processing by the post-processing step, as well as the completely processed data blocks (Bc) for display on a screen (24).

5. A "computer program" product for a video decoder comprising a set of instructions which, when they are loaded into the video decoder, causes the latter to effect the method of processing coded data blocks as claimed in claim 4.

6. A "computer program" product for a set top box comprising a set of instructions which, when they are loaded into the set top box, causes the latter to effect the method of processing coded data blocks as claimed in claim 4.

* * * * *